Jan. 9, 1968    L. D. ROOD    3,362,919
PROCESS FOR FOAMING THERMOSET ORGANIC MATERIALS
Filed Feb. 4, 1965
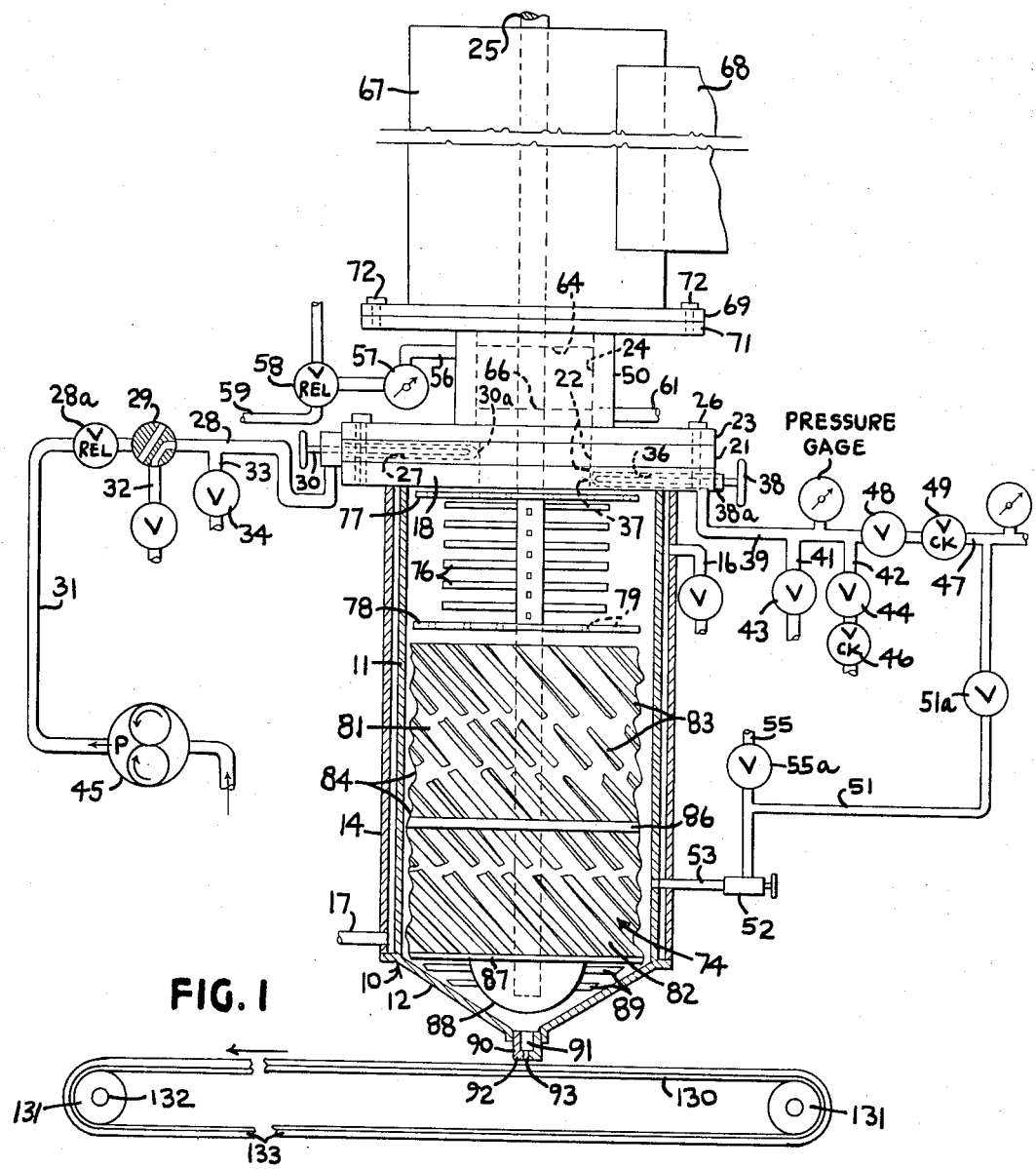
FIG. 1
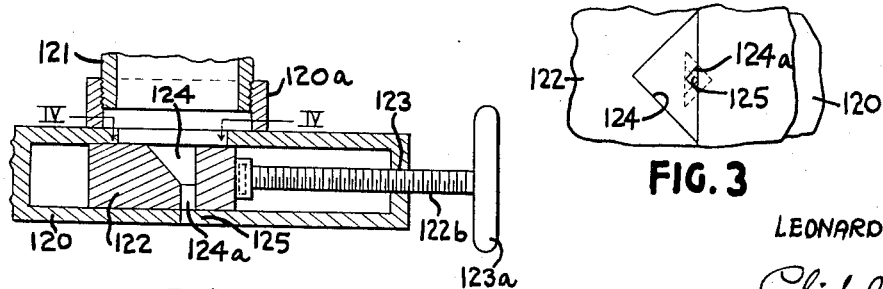
FIG. 2
FIG. 3
INVENTOR
LEONARD D. ROOD
BY Chisholm & Spencer
ATTORNEYS United States Patent Office 3,362,919
Patented Jan. 9, 1968

3,362,919
PROCESS FOR FOAMING THERMOSET
ORGANIC MATERIALS
Leonard D. Rood, Pitcairn, Pa., assignor to Pittsburgh
Plate Glass Company, Pittsburgh, Pa., a corporation of
Pennsylvania
Filed Feb. 4, 1965, Ser. No. 430,419
11 Claims. (Cl. 260—2.5)

ABSTRACT OF THE DISCLOSURE

This invention relates to a method of forming rigid, foamed, thermosetting resins, which method comprises admixing a viscous, liquid, organic material which will polymerize to form a thermoset, solid resin and a cellulating agent which contains substantial portions of a material which is gaseous under conditions existing in the foaming zone, said pressure being sufficient to maintain the material and cellulating mixture in a bubble-free condition, passing said mixture of organic material and cellulating agent through a pressure reduction zone with an orifice having a thickness of about 1/8 inch or less, said mixture being in a substantially bubble-free condition throughout its travel through the orifice into a foaming zone wherein the pressure and temperature are maintained so as to promote foaming and curing of the resin to a rigid, cellulated structure.

---

This application is a continuation-in-part of co-pending U.S. application Ser. No. 94,279, filed Mar. 8, 1961, now abandoned, wherein it is disclosed that useful rigid foamed resins may be obtained by admixing under pressure a viscous, liquid organic material which will polymerize to form a thermostat, solid resin, and a cellulating agent which contains substantial portions of a material which is gaseous under conditions existing in the foaming zone, then passing said mixture of organic material and cellulating agent through a pressure reduction zone of such dimensions that a substantially bubble-free stream is maintained in the pressure reduction zone, the substantially bubble-free stream being passed into a foaming zone wherein the pressure and temperatures are such that foaming and curing of the resin to a rigid, cellulated state is promoted.

This invention is particularly applicable to those foamable materials wherein at least about 50 percent by weight of the cellulating agent present is a material which is gaseous at the conditions existing in the foaming zone.

Rigid cellulated organic materials have become an important article of commerce. Polyurethane foams, in particular, have found wide acceptance as a rigid thermal insulating media. These cellulated materials, or foams, are generally produced by admixing a volatile liquid with the foamable organic resinous materials under pressure and then releasing the materials to atmospheric conditions wherein the organic material begins to foam and cross-link.

Polyurethane foams, for example, are produced by admixing a reactive hydrogen containing resinous material and an organic polyisocyanate with a blowing agent, for example, the halocarbons, such as trichloromonofluoromethane which has a boiling point of around 23.7° C. (about 75° F.), and discharging the catalyzed mixture to a foaming zone wherein the cellulating agent evaporates and the polyurethane reaction occurs. The polyurethane reaction occurs rather rapidly and the heat evolved is produced over a relatively short period of time, causing the cellulating agent to evaporate rather rapidly.

When unsaturated polyester foams are produced utilizing a method similar to that used with the polyurethane foams, it is found that because of the slower exothermic reaction of the unsaturated polyester, that the resin gels considerably before a substantial portion of the cellulating agent had become volatilized. Therefore, the polyester resins are not fully expanded when they become relatively rigid, and the continuing exotherm which produces more heat, causing further volatilization of the cellulating agent, results in the fissuring of the cells.

To compensate for the slow exotherm of the unsaturated polyester resins, it was found that it was necessary to include a more volatile cellulating agent than trichloromonofluoromethane. The more volatile cellulating agents are those having a boiling point less than about 50° F. and are preferably halocarbons. Although the unsaturated polyester resins react slowly, a rather rigid gel structure is formed when the cross-linking reaction is about 10 percent completed. Thus, the more volatile blowing agent, when included in amounts of about 50 percent by weight of the total blowing agent, caused the unsaturated polyester resin to become fully expanded by the time the substantially rigid cell structure had formed.

It was discovered, however, that the inclusion of 50 percent or more of the blowing agent as a volatile material having a boiling point of less than about 50° F., made conventional foaming processes and apparatus undesirable. Conventional foam apparatus was found to produce rigid foams having poor flow characteristics and excessive open-cells when the foamable material containing a blowing agent having at least about 50 percent by weight of a material having a boiling point below about 50° F. Conventional foaming apparatus is illustrated in FIG. 8 of the article "Frothing—A New Method for Producing Urethane Foams," Chemical Engineering Progress, page 40, October (1961).

Conventional foaming apparatus comprises a mixing chamber, an agitator and a let-down device. The mixing chamber is operated at a pressure sufficient to maintain the blowing agent, usually a volatile liquid, in a liquid state. The pressure is usually maintained at about 10 p.s.i.g. to about 200 p.s.i.g. The pressure of the mixing chamber is regulated by the feed rate of the resin components and the area of the opening in the let-down device (pressure reduction zone).

Although conventional apparatus of the type described above has not been satisfactory, it has now been discovered that thermosetting organic materials which contain 50 percent or more of the cellulating agent as a material having a boiling point of less than about 50° F. may be admixed under pressure and passed through a pressure reduction zone of such dimensions that the thermosetting organic material passes through said zone as a bubble-free stream. This is accomplished by utilizing a thin-edged orifice having a thickness of less than about 1/8" and preferably less than about 1/16" in thickness, with best results occurring when the orifice is of a knife-edged type. This invention is particularly useful when foams are prepared from a thermosetting organic material and a blowing agent which contains 50 percent, and especially 60 percent, and in particular 70 percent or more of a liquid which has a boiling point of less than about 50° F.

Although this invention is primarily useful in the preparation of rigid foams of thermosetting usaturated polyester resins, it is also useful in the preparation of polyurethane resins, epoxy resins or similar thermosetting resins utilizing a high percentage of a blowing agent having a boiling point of less than about 50° F.

The invention is particularly important in producing foams of unsaturated polyester resins inasmuch as such foams produced from cellulating agents which contain less than about 50 percent of a volatile liquid having a boiling point of less than about 50° F. are not commercially acceptable. Attempts to produce foams of unsaturated polyester resins in standard foam apparatus when the resin contains a blowing agent having more than 50 percent of the more volatile blowing agent, produces a foam which is also commercially unsatisfactory.

These and other features of the invention will be apparent from the drawings, in which:

FIGURE 1 is a simplified view, partially in elevation and partially in section, of a suitable mixing apparatus.

FIGURE 2 is a sectional detailed view of a second type of mechanism providing an extrusion orifice which is of variable sectional area.

FIGURE 3 is a fragmentary view taken substantially upon the line IV—IV of FIGURE 2.

The foam-forming apparatus as shown in the drawings comprises a mixing chamber 10 having a vertical wall 11 which may be either cylindrical or conical, though for purposes of illustration, it is shown as being cylindrical and as being upon a conical bottom 12. The side wall is jacketed, as indicated at 14, and the jacket is provided with an inlet 16 and an outlet 17 for the circulation of a coolant medium, such as water, designed to maintain proper temperatures within the chamber 10.

At its upper edge, the mixing chamber is provided with a top plate 18 welded to wall 11 and the edges of which extend outwardly to provide a coupling flange, and upon the top plate is disposed an intermediate plate 21. Both plates 18 and 21 are formed with relatively large coaxial openings 22 that provide an antichamber for introducing foamable materials into the mixing chamber 10.

A lower closure plate 23 welded to or integral with the lower edge of sealing chamber 24 for a shaft 25 is also disposed upon the plate 21, and the three plates 18, 21 and 23, are rigidly secured together as by bolts or screws 26 in a well-known manner. In order to seal the joints between the three plates 18, 21 and 23, gaskets (not shown) may be disposed between the plates.

For purposes of feeding resin-forming mixture into the mixing chamber, a passageway 27 is bored edgewise into the plate 21 and its inner end discharges into the antichamber of the mixing chamber formed by the openings 22 in the plates 18 and 21. A conduit 28 is also connected to the passageway and leads to a suitable source of liquid resin-forming material, such as one of the polyesters hereinafter more fully described, and a monomer, such as styrene. A needle valve 30 which opens and closes an orifice 30a in pasageway 27 may also be provided. Such orifice assists in preventing back-flow of resin from the chamber 10. As illustrated in the drawings, conduit 28 is provided with a relief valve 28a and with a two-way valve indicated diagrammatically at 29, which alternatively may be set to feed interpolymerizable mixture from a conduit 31, or to feed a flushing liquid, such as appropriate solvent, through a line 32 into the conduit 28 for cleaning the apparatus. A branch 33 upon the conduit 28 having a valve 34 provides means for discharging flushing fluids from the system. It is also admissiable to connect the line 32 to a passageway (not shown) in plate 21 for feeding flushing fluid to the mixing chamber. Preferably, such passageway is controlled by a needle valve corresponding to needle valve 30.

Means for feeding into the system gassing agent and, if desired, catalyst for the interpolymerization reaction, is illustrated as including a passageway 36 bored edgewise into the top plate 18 and being terminated at its inner end by an orifice 37 discharging fluid mixture of catalyst and foaming agent into chamber 10. Flow of catalyst and foaming agent may be regulated by an appropriate needle of a valve 38. The mixture of catalyst and gas-producing agent is supplied to the passageway 36 by means of a conduit 39 having branches 41 and 42. The branch 41 is appropriately designed for supplying a gas-producing agent, e.g. a liquid halocarbon, such as $CCl_3F$ or $CCl_2F_2$, to the conduit 39. Branch 42 may be used for supplying a gas, such as carbon dioxide, to the system. Valves 43 and 44 in the branches 41 and 42 can be used to provide means for regulating the proportions of the gas-producing agents. It is preferred, however, that the feed of liquids to the system be positively metered to the supply lines 28 and 39 for the mixing chamber 10, for example, by a positively driven gear pump 45, the feed rate of which can be regulated in well-known manner and which will maintain a uniform rate of feed. It will be observed that the branch 42 is provided with a valve, such as a relief valve or a check valve 46, by means of which the reverse flow of liquids through the system may be prevented in event that the pressure in the mixing chamber 10 should become excessive. The conduit 39 is appropriately connected with a source of catalyst material, such as one of the well-known interpolymerization catalysts, through the branch 47, and the flow of liquids through the latter conduit is controlled by a valve 48. Also, a check valve 49 is disposed in the system in order to prevent the unintended reverse flow of liquids through the system, should the pressure in the mixing chamber become excessive.

It will be observed that the inlet for gas-producing agent and catalyst is spaced substantially below the inlet for resin. This is desirable inasmuch as it assists in keeping catalyzed mixture away from the sealing chamber 24 and its seals, and therefore reduces the likelihood of fouling of the seals or the inlets to the sealing chamber by premature setting of any resinifiable mixture inadvertently escaping upwardly from the chamber.

It will be observed that the line 47 is further provided with a branch 51 leading to a needle valve 52, which is connected to a line 53 having an orifice (not shown) discharging into the lower portion of the chamber 10. By appropriate control of the valve 48 and the needle valve 52, the feed of catalyst to the mixing chamber may be proportioned between the upper and lower portions of the mixing chamber. In some instances, it may be desirable to feed all of the catalyst into either the upper or the lower section of chamber 10. Sometimes it may be desirable to feed a part into each of the two sections. It will also be evident that additional connections may be provided for supplying catalyst to intermediate zones of the mixing chamber.

Needless to say, the several components of the foam; namely, the polyester, monomer, gassing agent and catalyst, may be fed into the mixing chamber 10 through separate unbranched lines having their individual valve controls.

Line 51 may also be provided with a branch 55, by means of which gassing agent and/or catalyst may be fed into the mixing chamber 10 through needle valve 52. Valves 51a and 55a may be used to determine which line (51 or 55) is used to feed to the needle valve 52.

Various types of seals for sealing about the shaft 25 may be provided; many of these are known to the art. They may be single seal, in which instance the seal runs in a bath of resin from the mixing chamber and is cooled thereby. The inlet for the catalyst to the chamber 10 should then be well below the zone of the seal in order to prevent contact of the seal with the resin after it has been catalyzed. The single seals may be balanced or unbalanced or semi-balanced, as will be readily understood. For purposes of illustration, a pair of spaced seals with means to feed fluids under pressure are shown. In this construction, conduits for circulation of fluid under pressure in the space between the seals is provided. The sealing chamber 24 is thus equipped with an inlet 56 for coolant medium, which medium preferably is maintained under pressure substantially above (e.g., 10 to 200 pounds above) that in the mixing chamber 10 in order to prevent the escape of foamable mixture from the latter chamber about the impeller shaft 25. Coolant medium may be water or other liquid medium, such as a glycol or even a halogenated hydrocarbon, such as $CCl_3F$ or $CCl_2F_2$. The line 56, as illustrated, may be provided with a pressure gauge 57, by means of which the pressure of the coolant medium may be observed. Line 56 is also connected to a relief valve, indicated diagrammatically at 58, designed to divert the flow of liquid to the chamber 24 in event that the latter for any reason should be choked, as by the accidental upward leakage about shaft 25 and subsequent gelation of interpolymerizable mixture from the mixing chamber. The relief valve is further provided with a conduit 59, by means of which the coolant may be diverted in event the pressure in the chamber 24 should become excessive. Means (not shown) to supply coolant medium may comprise a conventional reciprocating pump connected to a suitable surge tank (also not shown) designed to maintain the flow of liquid from the reciprocating pump (not shown) to chamber 10 under substantially constant pressure. The coolant medium is discharged from the sealing chamber 24 by means of a conduit 61 which may lead back to the original source of supply of coolant medium in order to maintain continuous circulation. Rotary impeller shaft 25 at one end extends downwardly through the sealing chamber and conventional seals (upper and lower) 64 and 66 are disposed within the chamber 24 and provide a close, fluid-tight seal about the shaft, both at the top of chamber 24 and at the point of entrance of the shaft to the mixing chamber 10. Since the seals are conventional in design, it is not considered necessary to describe them in detail.

The fluid under pressure in the chamber 24 cools the seals as they operate and prevents heat build-up in the regions about the seals. The pressure, being in excess of that in chamber 10, also positively prevents backward flow of fluids from chamber 10 through the lowermost seals.

It will be apparent that many mechanical seals, now available as commercial articles, for rotating shafts are of such excellence that the back pressure is not required to prevent upward loss of material from chamber 10. In case one of these is used, the coolant medium may be merely flowed through chamber 24 without any particular head of pressure. In event that chamber 24 is not pressurized, the upper seal 64 may be retained or dispensed with, as may be desired. So-called balanced seals, unbalanced seals or semi-balanced seals may be used.

The upper portion of the shaft 25 extends through a journal or bearing 67 of conventional design, which for purposes of illustration is indicated as being formed with or attached to a support 68. The lower portion of the bearing is also provided with an attaching flange 69 upon a top flange 71 of the sealing chamber 24. Bolts 72 extending through the flange 69 and flange 71 provide means for securing the mixer assembly to the bearing 67.

Agitator means indicated broadly at 74, is disposed upon the lower extremity of the impeller shaft 25 and may comprise any convenient construction for agitating the liquid mixture of unsaturated polyester, monomer, gas-producing agent and catalyst as it passes downwardly through the chamber 10. However, for purposes of illustration, the construction is shown as comprising a pin section including pin-like vanes 76, which may extend through or otherwise be attached to the lower portion of the shaft 25 and which operate turbulently to mix the various components of the foamable mixture as they flow down through the chamber 10.

In order further to increase the thoroughness of mixing, one or a series of distributor plates may also be rigidly secured upon the shaft 25. One of these plates is indicated at 77 immediately above the pin-like impellers 76, while another 78 is disposed immediately below the pin-like impellers. As many of these distributor plates as may be desired may be used. They preferably are provided with a series of slots or holes, as at 79, which operate to permit the liquid mixture flowing downwardly through the chamber to pass, but in so doing, there is a relatively thorough redistribution of the liquid in the chamber so that all portions thereof are subjected to a thorough beating operation.

Below the distributor plate 79 is disposed an agitator element 81 which is designed to produced a high degree of shearing action upon the mixture. To this end, the section is disclosed as involving a central core 82 having numerous ridges or fins 83 extending spirally thereabout. As illustrated, these fins may also have notches 84 formed at intervals therealong. Such notches sometimes facilitate the more thorough agitation of the mixture. It is desirable that the clearance between the fins and the inner perimeter of the chamber 10 be relatively small, for example, of the order of $\frac{1}{100}$ inch. This assures that as the liquid mixture flows downwardly through the chamber, it is subjected to a high degree of shearing action. In order to promote very thorough distribution of the several components of the mixture, it has also been found to be helpful to provide one or more peripherally extending fins or ridges 86 upon the core 82, and this fin or ridge is also machined or otherwise formed to fairly close tolerance with respect to the wall of the chamber. These ridges have the effect of interrupting the flow of liquid mixture downwardly through the grooves between the fins and thus effecting thorough redistribution thereof. But a single peripheral fin 86 is illustrated. However, it will be recognized that substantially any number that may be desired may be used.

It will be observed that the core 82 is disposed upon a plate element 87 terminated in a dome-like protuberance 88 which projects downwardly into proximity to the sides of the cone-like bottom element 12 and may be used as a nut for screwing upon the tip of the shaft. If desired, the nut 88 may also be equipped with pins or impeller blades 89 in order to give further mixing in the lower portion of the chamber 10.

At its apex, the bottom element is provided with an orifice which performs as a pressure reduction zone. As shown, the orifice comprises a plug elemet 90 having a cylindrical bored portion 91 of relatively large diameter-to-thickness ratio designed to permit the flow of the liquid mixture to the outlet orifice with a minimum of friction. At the bottom of the bore 91 is disposed the bottom 92 having an outlet orifice 93 which is A–1 of a transverse section so designed as to maintain a head of back pressure in the mixing chamber which is substantially above the vapor pressure of the gas-producing agent being mixed into the polymerizable components. This pressure, will of course, depend upon the specific gas-producing agent employed, the viscosity of the mixture, the capacity of the mixer, and such like independent variables, thus precluding the enunciation of any definite rules for proportioning of a fixed orifice, other than that the dimensions should be such as, under a given set of conditions, will assure an adequate back pressure in chamber 10. If the back pressure is sufficient, the mixture will be ejected as a relatively uniform jet, but will foam at once to give a highly uniform structure of uniform bubbles, resembling shaving cream of the foam-shave type which is ejected from a nozzle in a container under the pressure of a volatile halocarbon. If the pressure is not sufficient, foaming of the mixture in mixing chamber 10 will be premature. The foam structure will be broken up and large bubbles and other defects will occur.

Often, it is desirable to provide a series of orifice plugs with graduated openings to admit of selection of a proper size under given conditions. The thickness of the bottom 92 preferably should be relatively low in order to prevent excessive pressure drop while the liquid is still within the orifice.

It will be recognized that the thickness of the plate 92 through which the orifice is formed, as well as the shape of the orifice, as a strong bearing upon the behavior of the system. The orifice should be designed to give as abrupt a pressure drop as possible and as near as possible to the zone where the mixture strikes the atmosphere. With thicker metals, there is a definite tendency of the pressure to drop in the passage of the liquid through the orifice before the liquid actually reaches the atmosphere. This may be objectionable if the pressure should drop below the vapor pressure of the gas-producing agent before the mixture is emitted from the orifice, thus producing a coarse, irregular structure. When the metal is of correct dimensions, uniformly fine cell structures are obtained in the foam. If the orifice is of conical longitudinal section, the metal in which it is formed may be much thicker without causing premature pressure drop while the mixture is passing through the orifice. The orifice must also be of a size to allow passage of a mixture of given viscosity at desired rate at pressures within the capacity of the apparatus.

In event that carbon dioxide or other gas is employed in the mixing operation, the pressure should be sufficient to assure the substantial complete absorption of the gas in the liquid while it is within the chamber. In those instances wherein a halocarbon is employed as a gas-producing agent, the absorption of the gas-producing agent in the resin components is not necessarily complete. It is sufficient if the gas-producing agent in liquid phase is merely distributed in the resin components.

The specific diameter of the orifices required to attain the desired back pressure in the chamber, of course, varies dependent upon the viscosity of the liquids in the chamber. With a mixture having a Newtonian viscosity of about 6,000 to about 11,000 centipoises, an orifice having a diameter of about $3/64$ inch is sufficient to permit a feed rate of about 81 pounds of resinifiable mixture per hour. If a larger orifice is to be employed, the viscosity of the mixture may be increased and the throughput can still be maintained at such value as to assure a pressure within the chamber 10 above the vapor pressure of the gas-producing agent. There appears to be no particular definite limit to the upper pressure which may be employed in the mixing chamber 10, though, of course, very high pressures tend to be uneconomical. Usually, it is preferred not to increase the pressure excessively above that required to obtain a satisfactory throughput when a given viscosity of resin is employed. There is no particular upper limit to the viscosity of resin, though usually the latter will not exceed about 100,000 centipoises.

In some instances, it may be desirable to provide thixotropic mixtures as the resin component. Under the conditions of high shear in the mixing chamber, these lose their high viscosity. However, after the materials pass through the orifice, they quickly recover much of their original viscosity. This recovery helps to retain the gas in the foaming mixture. In event thixotropic mixtures are used, the resin feed may be of very high initial viscosity, provided this viscosity drops sufficiently under agitation to permit passage of the liquid through the orifice.

It will be recognized that the interpolymerizable mixture from the orifice 93 may be received in molds or containers designed to impart definite shape and size to the foamed mixtures. For purposes of illustration, the apparatus is shown as including a conveyor belt 130 traveling upon rollers 131 on shafts 132. It will be recognized that the interpolymerizable mixture may be received directly upon the belt or, if preferred, containers may be disposed in succession upon the belt to be appropriately filled with the mixture as the conveyor travels along. In the drawings, the belt is shown as having deckle straps 133 at the edges thereof which act to retain the liquid mixture before it has become sufficiently gelled to assure that it will be retained upon the belt.

The orifice 93 preferably is disposed near the conveyor 130 so that the jet of mixture is forced to spread laterally as it strikes the belt. Spreading may also be promoted by use of baffles, doctor blades, or other devices. It will be recognized that in some instances the jet of interpolymerizable mixture from a single orifice is not sufficient to provide a sheet of adequate width. In order to obviate this difficulty, a series of nozzles may be mounted in side-by-side relation or in echelon so that the edges of the several strips of foamable material laid down in foaming will expand into contact with each other, thus to provide a substantially unitary sheet. The conveyor belt may be of any desired length to allow adequate curing of the interpolymerizable mixture. Cure may be at room temperature or may be promoted by an appropriate baking operation as may be required by the specific interpolymerizable mixture being treated. The sheet at the unloading end of the conveyor belt is drawn off, as indicated at U, and may be wound upon rollers or may be cut into sections as may be required.

The orifice may be of any convenient outline and, for example, it may be circular or as illustrated in FIGURES 2 and 3, is triangular and coacts with a correspondingly shaped opening 125 formed in the lower portion of the valve casing 120. In the construction as shown, it will be apparent that as the valve gate 122 is advanced or retracted by the valve stem 122b, the effective size of the orifice is reduced or increased, dependent upon the direction of travel of the gate. In the construction as shown, the shape of the section of the orifice is maintained homologous throughout the travel; that is, the angles at the corners of the orifice are maintained constant, thus assisting in maintaining uniformity of the flow and conditions in the stream of foamable material as it emerges from the orifice. A very satisfactory shape for the orifice is one in which all of the angles are substantially right angles. Other shapes could be employed, if desired. The orifice plates illustrated in FIGURE 2 are of thin cross-section.

An important feature of the orifice construction for the mixing chamber as illustrated in FIGURE 2 resides in the fact that substantially any degree of back pressure within the mixing chamber can be maintained by adjusting the effective area of the outlet, and this pressure does not diminish greatly until after the liquid foamable mixture has been discharged or is at the point of discharge to atmospheric pressure. The premature foaming of the mixture owing to the volatilization of the gassing agents before the mixture emerges from the orifice is obviated. Any premature foaming is detrimental inasmuch as the agitation of the mixture in discharging the same, if foaming has appreciably progressed before such agitation, tends to break up the foam structure and thus to reduce quality of the final foamed product.

It will be recognized that in the operation of the apparatus, the outlet orifices as shown in FIGURE 2 can be adjusted to maintain substantially any desired pressure while at the same time, the rate of feed of the several constituents of the foamable mixture to the mixing chamber 10 is maintained substantially uniform. In order to assure that the feed is substantially uniform at any given back pressure within the mixing chamber, positive metering pumps for feeding the several resin constituents into the mixing chamber should be employed. These assure that a uniform, or nearly uniform, rate of feed to chamber 10 is maintained, regardless of the back pressure in the chamber as set up by the changes in the size of the orifice. The gear pump 45, when operated at low rate of feed, provides a simple means for positively metering a uniform feed into the mixing chamber.

Similar positive feed metering apparatus may be provided for the catalyst and gassing agents which are fed through the line 39. Since these devices are conventional in construction, it is not necessary again to illustrate them.

In the operation of the apparatus, it will be apparent that the metering or proportioning pumps may be adjusted to deliver a feed of resin and other foam-forming constituents into the mixing chamber at any predetermined rate in accordance with the size of the apparatus or the throughput desired. The discharge orifice at the bottom of the chamber is then carefully adjusted until a back pressure sufficient to prevent substantial bubble formation within the mixing chamber is eliminated. The stream S of foamable material is then abruptly discharged through the orifice from a pressure sufficient to prevent bubble formation to atmospheric pressure, and immediately after emergence from the orifice or upon striking the supporting surface, such as the belt 130, the gas-producing agent volatilizes or escapes into the mixture, thus producing foaming action. Subsequently, the resin constituents are polymerized to provide a solid resin structure.

The foregoing apparatus is useful in the mixing of various viscous materials under pressure. The invention in certain of its aspects is, therefore, not limited to the mixing of catalysts, gassing agents and other constituents with foamable mixtures comprising unsaturated polyesters, monomers and gas-forming agents. However, it is considered to be particularly applicable in the latter field. Another field in which it might be used comprises the formation of mixtures which may be used to form foamed polyurethane resins, as for example, to form mixtures of a polyisocyanate and a polyester containing hydroxyl groups.

The following constitutes an example of one such mixture of polyester, monomer, gas-producing agent and catalyst.

*Example I*

The polyester component was obtained by the esterification reaction of the following ingredients:

|   | Moles |
|---|---|
| Isophthalic acid | 4 |
| Triethylene glycol | 9.7 |
| Maleic anhydride | 6 |

The reaction to form the polyester preferably was continued until a hydroxyl number of 0 to 20 and an acid value of 34 was obtained.

The polyester also included a small amount of one of the gelation inhibitors; namely, 0.015 percent of hydroquinone. This component may be added hot, or cooked into the mixture. The amount thereof could be varied, for example, in a range of 0.001 to 0.1 percent by weight. The hydroquinone could be replaced by other gelation inhibitors of the phenolic type, e.g., 3-isopropyl catechol or tertiary butyl catechol. A salt of a quaternary ammonium compound and a strong mineral acid, e.g., trimethyl benzyl chloride or diisobutylphenoxyethoxyethyl dimethyl benzyl ammonium chloride monohydrate, in an amount of 0.01 to 1 percent could be added. These function as gelation inhibitors during storage of the resin, as disclosed in Parker Patent 2,593,787, or as synergists for the catalyst during curing of the resin, as disclosed in Parker Patent 2,740,765, dependent upon whether they are present in conjunction with or in the absence of peroxidic catalyst. Copper naphthenate may also be added to the mixture while it is being cooked and is found to be helpful as a stablizer in the polyester mixture before curing.

As indicated in the above Parker patents, other alpha, beta-ethylenic dicarboxylic acids and non-ethylenic dicarboxylic acids, and other polyols than those above-mentioned may be used in forming polyesters. The polyester given is very satisfactory, but is disclosed primarily by way of illustration.

The polyester containing a suitable gelation inhibitor was mixed with a monomer; namely, styrene, in a ratio to provide a liquid interpolymerizable mixture containing:

|   | Percent by weight |
|---|---|
| Polyester | 80 |
| Styrene | 20 |

This is based upon the interpolymerizable resin-forming mixture.

The ratio could be varied in a range of approximately:

|   | Percent by weight |
|---|---|
| Polyester | 60 to 90 |
| Styrene | 10 to 40 |

This mixture has a gel time at 77° F. in a range of about 1 to 12 minutes. Styrene could be replaced by other monomers containing the terminal ethylenic $>C=CH_2$ group, e.g., by vinyl toluene and others as disclosed in the Parker patents.

To give strength to the freshly formed, uncured foam, a compatible plastic, such as cellulose acetate butyrate, in an amount of about 0.5 to about 5 percent by weight based upon the mixture may be added.

This interpolymerizable mixture could further be modified, as for example, by emulsifying agents or surfactants designed to promote foam formation. Many of these are disclosed in "Detergents and Emulsifiers" by John W. McCutcheon, copyrighted in 1960 by John W. McCutcheon, Inc., Fifth Ave., New York, N.Y. Examples of such emulsifiers are Tween 40 (polyoxyethylene sorbitan monopalmate) and diisobutylphenoxyethoxyethyl dimethyl benzyl ammonium chloride monohydrate (added cold). The amount of emulsifier may vary in a range of about 0.05 to 3 percent by weight based upon the mixture.

A small amount of a promoter, such as a soluble salt of a so-called drier metal and being represented by cobalt naphthenate or octoate, could also be added. Copper naphthenate may also be added. Its effect, as already indicated, is effective to stabilize the mixture.

To give self-extinguishing properties to the resin foams, flame retarding agents, such as antimony trioxide, in an amount of about 5 to about 20 percent by weight based upon the mixture could be added. Chlorinated waxes, such as chlorinated paraffin, increase flame resistance. Chlorinated wax sold as "Chlorowax 70" and having a molecular weight of about 1060 is an example. This material also promotes emulsification and when it is used, other emulsifiers may be omitted. The amount of chlorinated wax, when it is used, may vary in a range of about 5 to about 25 percent based upon the mixture. The flame retarding agents could be omitted for many applications of the foamed resin.

It has been found that the stability of the foams during the stage prior to advanced interpolymerization of the polyester and monomer can be substantially improved by adding a modicum of an organic acid, such as fumaric acid or maleic acid (or its anhydride). The amount of stabilizing acid, if used, may vary in a range of about 0.05 to 3 percent by weight based upon the mixture.

An unsaturated polyester-monomer mixture made up with suitable emulsifiers and, if desired, with synergist for the catalysts, flame retarding agents and the like, constitutes the resin forming component A of the foamable mixture. Its fundamental components are unsaturated polyester, monomer, gelation inhibitor and emulsifier; with these ingredients in component A as the resin feed, foams can be produced. To obtain the best foams, other ingredients such as the synergists, emulsifiers, foam strengthening agents, and flame retarding agents, should be added. The mixture comprising component A should be a liquid, but having a minimum viscosity of about 6000 or 8000 centipoises. Viscosity may be much higher within the capacity of the mixer to handle the same.

The foregoing liquid mixture is relatively stable until catalyst is added and may be fed through the inlet conduit 8 to the top of the mixing chamber for incorporation with gassing agent and catalyst.

A specific example of a relatively sophisticated component A comprises:

| | |
|---|---|
| Polyester-styrene mix [1] _____grams__ | 13,600 |
| Cellulose acetate butyrate _____percent__ | 2 |
| Styrene _____do____ | 4.5 |
| Cobalt octoate solution containing 12 percent cobalt _____percent__ | 0.3 |
| Copper naphthenate containing 8 percent copper _____percent__ | 0.05 |
| Clorowax 70 _____do____ | 15 |
| Fumaric acid _____do____ | 0.3 |

[1] This mix contained 0.015 percent hydroquinone and 0.2 percent of diisobutylphenoxyethoxyethyl dimethyl benzyl ammonium chloride monohydrate.

This mixture was fed through conduit 28 to mixing chamber 10 at room temperature (about 77° F.).

Package B comprised a liquid but volatile gassing agent and a peroxidic catalyst for curing of Package A. The gassing agent in this instant comprised:

| | Percent by weight |
|---|---|
| $CCl_2F_2$ _____ | 95 |
| $CCl_3F$ _____ | 5 |

The catalyst in this instance comprised methyl ethyl ketone peroxide dissolved in dimethyl phthalate to provide a 60 percent solution. This was fed through line 47 while liquid gassing agent was fed through line 41, and the two were mixed in line 39 to provide component B, the ratio of catalyst being 1 percent by weight based upon the interpolymerizable materials in component A. The mixture constituting component B was discharged into chamber 10 at a rate of 17 pounds per 100 pounds of component A. The ratio of carbon dioxide to gaseous halocarbon may be varied in any desired range from 0 to 100 percent of either component base based upon the total gassing agent. A good range is about 5 to about 95 percent by volume of the volatilized halocarbon, the rest being carbon dioxide. A good mixture of gassing components calculated upon the gaseous state is about 50 percent by volume of each. Thus, in Example I the 17 pounds of the mixture:

| | Parts by weight |
|---|---|
| $CCl_2F_2$ _____ | 95 |
| $CCl_3F$ _____ | 5 | may be replaced by a mixture comprising 8 pounds of the foregoing mixture of $CCl_2F_2$ and $CCl_3F$, and 2.7 pounds of carbon dioxide per 100 pounds of resin feed. This provides a mixture wherein the halo carbons when gassified are equal in volume to the carbon dioxide. The same feed of catalyst (methyl ethyl ketone peroxide) is maintained. Other peroxidic catalysts than methyl ethyl ketone peroxide can be used. Examples of these are benzoyl peroxide, cumene hydroperoxide and others such as are listed in the Parker patents.

Components A and B were supplied at a rate to maintain a back pressure in the chamber in excess of the vapor pressure of gassing agent in the chamber. This back pressure at room temperature of 77° F. should be in excess of the vapor pressure of the $CCl_2F_2$ (about 30 pounds per square inch) and may be about 200 to 400 pounds per square inch or much higher, if desired. The catalyst-gassing agent mixture was discharged into mixing chamber 10 at a level below that of introduction of component A. This assists in preventing catalyzed and gellable mixture from seeping past the seal around shaft 25 and thus blocking the sealing chamber 24 or its appurtenances, and also stopping binding of the seal and shaft.

Some or all of the catalyst may also be introduced into the mixing chamber through line 51.

If desired, at least a part of the gassing agent may be carbon dioxide gas supplied to the system through line 42. The pressure in the system and the feed rate should be such as to effect solution of the gas in the mixture in chamber 10. Volatile liquid gassing agents need not be dissolved, although a solution is preferable, it is sufficient if the gassing agent is dispersed as an emulsion by the whipping action of the agitation in the chamber before the mixture is discharged through the orifice.

The foamable mixture in which all components are thoroughly dispersed or dissolved by the shearing and stirring effect of the agitator, is discharged through orifice 93. Owing to the pressure in the system and the shape and size of the orifice 93, foaming action does not become appreciable until the mixture is in, or past said orifice. This prevents premature foaming action, which would lead to collapse of the foam. Almost immediately after the mixture is discharged and the pressure has dropped, the gassing agent begins to volatilize to give a very fine-celled uniform foam structure. In a short time, the unsaturated polyester and monomer begin to gel and set. This action may be allowed to go to completion without application of external heat, but the rate of setting may, of course, be increased by baking the foam at a temperature of about 100° F. to 250° F. for a time interval in a range of about 10 minutes to about 2 hours or more.

In the ultimate structure, the resin was firm and thermoset, and had good strength and rigidity. Its density was in a range of about 2 to about 4 pounds per cubic foot, but this value can be varied by increasing or decreasing the amount of gassing agent supplied to the mixture.

The foregoing is but an example of an unsaturated polyester-monomer mixture; however, it is a very good one. Other unsaturated polyesters and other monomers may be used. Also, other inhibitors, catalysts, synergists, emulsifying agents, flame-proofing agents and gassing agents may be used. The proportions of the several reagents may be varied over a wide range.

Another type of foam product which may be prepared by use of the process and apparatus described is obtained by cross-linking a polyol and a polyisocyanate in the presence of a suitable catalyst agent.

In such preparation, a gas-producing agent, such as a volatile hydrocarbon or a halocarbon such as has already been described, is incorporated into the foamable mixture in the mixing chamber 10. Organic polyisocyanates may be reacted in approximate equivalency with the polyol component to provide a polyurethane resin in a one-stage operation, or a portion of the polyol may be reacted with the organic polyisocyanate to form a so-called prepolymer that is then reacted with the rest of the required polyol in a separate stage to provide the final product. Appropriate organic polyisocyanates comprise:

Toluene diisocyanate
Diphenyl diisocyanate
Triphenyl diisocyanate
Chlorophenyl-2, 4-diisocyanate
Ethylene diisocyanate
1,4-tetramethylene diisocyanate
P-phenylene diisocyanate
Hexamethylene diisocyanate
3,3'-dimethyl-4,4'-biphenylene diisocyanate
3,3'-dimethoxy-4,4'-biphenylene diisocyanate
Polymethylene polyphenyl isocyanate
Diphenylmethane-4,4-diisocyanate Mixtures of two or more of these isocyanates are contemplated. Likewise, so-called prepolymers obtained by mixing and reacting one or more of these diisocyanates in excess with a polyol, which may be a polyester or other material containing a plurality of hydroxyl radicals per molecule, are contemplated. Prepolymers may be formed by mixing the polyol and the organic diisocyanate. Heat to speed up reaction is optional.

Various polyols may be used to react with the organic polyicocyanate. For example, the ester polyols resulting from the esterification reaction of a dicarboxylic acid and an excess of a polyol, such as a glycol or a glycol mixed with a polyol containing three or more hydroxyls, e.g., pentaerythritol, trimethylolethane, or the like, said polyesters having hydroxyl values in a range of about 40 to about 600, may be used. The polyisocyanates cross-link the polyesters through polyurethane linkages. The polyisocyanates are used in approximate equivalency with respect to the hydroxyl groups of the polyester.

Another convenient type of polyol which may be used is obtained by reaction of a carbohydrate, such as sorbitol, with an oxide of a lower aliphatic hydrocarbon, and being represented by ethylene oxide, propylene oxide, 1,2-butylene oxide, and the like. The reaction preferably is conducted under pressure, e.g., in an autoclave, and in the presence of an oxyalkylation catalyst, e.g., sodium or potassium hydroxide, and a small amount of water, e.g., about 10 to 17 percent by weight of water, or such amount of water as will effect solution of the carbohydrate. A catalyst of oxyalkylation, such as sodium hydroxide, potassium hydroxide, calcium hydroxide, or other base, is added. The alkylene oxide is added as fast as it can react. When the carbohydrate is sorbitol, the moles of alkylene oxide used preferably are at least equivalent to the available hydroxyl groups thereof and may, for example, be in a range of about 6 to about 30 moles and preferably are in a range of 10 moles or higher. As a result of the reaction, at least some ether chains involving two or more of the alkyl groups of the alkylene oxide are interconnected by ether linkages and the resultant ether chains are terminated by a hydroxyl group.

In order to produce a foam from this prepolymer, a halocarbon, such as $CCl_3F$, $CCl_2F_2$, or the like, is used as a gas-producing agent and in an amount to give a foam of desired density. A polyol, such as sorbitol polyol, is also added to react with the available isocyanate groups in the prepolymer. Usually, a surfactant is added to increase or stabilize foaming.

Examples of surfactants which may be used in forming foams from either the polyester-monomer system or the polyurethane system comprise the so-called Pluronics (sold by the Wyandotte Chemical Company), which have been described as being condensates of ethylene oxide with a hydrophobic base formed by condensing propylene oxide with propylene glycol. These are of a molecular weight in a range of about 2000 to about 8000, and are ascribed the formula $HO(C_2H_4O)_a(C_3H_6O)_b(C_2H_4O)_cH$.

Another of the more satisfactory surfactants which has been found very effectively to maintain the cell structure in the foaming and curing of fire resistant polyurethane resins comprises derivatives of the silicones. One such product is approximately of the formula:

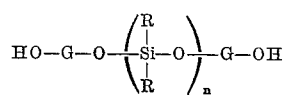

wherein G is the alkyl radical of a lower glycol, such as ethylene, propylene or butylene, and groups R are alkyl or hydroxy-substituted alkyl containing from 1 to about 4 carbon atoms, and $n$ is a number from 1 to about 20. It is a liquid product having a viscosity of 550 centipoises, refractive inder of 1.4435, and a specific gravity at 25° F. of 1.02. One such material is sold as Dow Corning–199. Still another highly useful silicone base surfactant comprises the so-called X–521 from the Union Carbide Corporation. Other surfactants, especially the liquid or soluble non-ionic members of the family, are useful. The surfactants may be employed in amounts within a range of about 0.1 to about 3 percent by weight based upon the mixture of polyol component and the organic isocyanate component. In relatively dense foams, for example, those weighing about 5 or 6 pounds and upward per cubic foot, the surfactants may be omitted entirely.

A catalyst of polyurethane formation may also be added in order to speed curing. Appropriate catalysts comprise:

Tetramethyl guanidine
Tetramethyl-1,3-butanediamine (TMBDA)
Triethylene diamine (DABCO)=

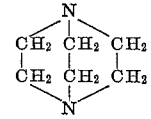

Dimethylethanolamine (DMEA)
Tin esters, such as:
　Stannous oleate
　Stannous octoate
　Dibutyl tin dilaurate and other catalysts such as are employed in forming polyurethane foams. These are but illustrative. Those catalysts conventionally employed in forming polyurethane resins may be used in the preparation of the fire retardant polyurethane foams of this invention.

The amount of catalyst may vary in a range of about 0.1 to about 5 percent by weight based upon the reactive components in the foamable mixture.

It will be appreciated that it is not in all instances necessary to form the prepolymer of polyisocyanate component and the polyol. These two components may also be fed concurrently but separately into the chamber 10. Also, the gas-producing agent may be added separately, as for example, through the line 51 or the line 39. The polyether polyol, the polyisocyanate and the gas-producing agent are then all intimately mixed under pressure in the chamber 10 and the mixture thereof is then discharged before foaming and curing in the manner already described.

The use of the process and apparatus as herein disclosed for forming a foamable mixture of a glycidyl polyether is within the purview of this invention. Thus, a glycidyl polyether may be prepared by reacting 2,2-bis-(4-hydroxyphenyl)propane, known as Bisphenol A, with epichlorohydrin to form a glycidyl polyether of an epoxy equivalent weight of about 100 to about 300 and a viscosity of about 10,000 centipoises. The commercial resin known as Epon 834 is satisfactory for the purpose. This resin is fed into chamber 10 as a stream through inlet 28, while gassing agent, such as $CCl_3F$ or $CCl_2F_2$, and catalyst are fed into the other side of the chamber through lines 39 or 51. The catalyst or hardening agent may be one of those heretofore recognized as suitable for curing epoxy resins. Primary and secondary amines are suitable, as are dicarboxylic acids and anhydrides thereof. Gassing agent and catalyst may be added together as through lines 39 or 51, or the gassing agent may be added through line 39 while catalyst (or a solution thereof) may be added through line 51. An emulsifier, such as Triton X–100, may also be used in an amount of 0.1 to 3 percent by weight based upon the total mixture.

The pressure conditions already described in connection with the polyesters are maintained. The mixture abruptly ejected from the orifice of chamber 10 may be allowed to foam at atmospheric pressure. The exothermal rise of the mixture may be relied upon to effect cure, or the foams may be heated if fast cures are desired.

Although specific examples of the invention have been set forth hereinabove, it is not intended that the invention be limited solely thereto, but to include all of the variations and modifications falling within the scope of the appended claims.

I claim:

1. A method of forming a rigid, foamed resin comprising admixing under pressure a viscous, liquid, organic material which will polymerize to form a thermoset, solid resin and a cellulating agent which contains substantial portions of a material which is gaseous under conditions existing in the foaming zone, said pressure being sufficient to maintain the material and cellulating mixture in a bubble-free condition, passing said mixture of organic material and cellulating agent through a pressure reduction zone with an orifice having a thickness of about 1/8 inch or less, said mixture being in a substantially bubble-free condition throughout its travel through the orifice into a foaming zone wherein the pressure and temperature are maintained so as to promote foaming and curing of the resin to a rigid, cellulated structure.

2. The method of claim 1 wherein the rigid, foamed resin is selected from the group consisting of unsaturated polyester resins, polyurethane and polyepoxide resins.

3. The method of claim 2 wherein the cellulating agent contains at least about 50 percent by weight of a material which is gaseous under conditions existing in the foaming zone.

4. The method of claim 2 wherein the cellulating agent contains at least about 50 percent by weight of a halocarbon having a boiling point of less than about 50° F.

5. The method of claim 2 wherein the pressure reduction zone comprises an orifice having a thickness of less than about 1/16 inch.

6. The method of claim 2 wherein the pressure reduction zone is a knife-edged orifice.

7. The method of claim 2 wherein the viscous, liquid, organic material which will polymerize to form a theroset, solid resin is an unsaturated polyester resin.

8. The method of claim 7 wherein the cellulating agent contains at least about 50 percent by weight of a material which is gaseous under conditions existing in the foaming zone.

9. The method of claim 7 wherein the cellulating agent contains at least about 50 percent by weight of a halocarbon having a boiling point of less than about 50° F.

10. The method of claim 7 wherein the pressure reduction zone comprises an orifice having a thickness of less than about 1/16 inch.

11. The method of claim 7 wherein the pressure reduction zone is a knife-edged orifice.

References Cited

UNITED STATES PATENTS 2,576,073    11/1951    Kropa et al. _____ 260—2.5

FOREIGN PATENTS 821,342    10/1959    Great Britain.
822,546    10/1959    Great Britain.

OTHER REFERENCES

Stengard et al.: Dupont Hylene Foam Bulletin, Aug. 25, 1960. Knox-Dupont Hylene Foam Bulletin, Sept. 12, 1960.

MURRAY TILLMAN, *Primary Examiner.*

J. C. BLEUTGE, *Assistant Examiner.*